(12) United States Patent
Aihara et al.

(10) Patent No.: US 10,456,982 B2
(45) Date of Patent: Oct. 29, 2019

(54) DEFEATURING TOOL FOR ADDITIVE MANUFACTURING OF OBJECTS

(71) Applicant: MATERIALISE N.V., Leuven (BE)

(72) Inventors: Syuhei Aihara, Leuven (BE); Gert Claes, Leuven (BE)

(73) Assignee: Materialise N.V., Leuven (BE)

( * ) Notice: Subject to any disclaimer, the term of this patent is extended or adjusted under 35 U.S.C. 154(b) by 0 days.

(21) Appl. No.: 15/755,290

(22) PCT Filed: Aug. 26, 2016

(86) PCT No.: PCT/US2016/048901
§ 371 (c)(1),
(2) Date: Feb. 26, 2018

(87) PCT Pub. No.: WO2017/040251
PCT Pub. Date: Mar. 9, 2017

(65) Prior Publication Data
US 2018/0246994 A1    Aug. 30, 2018

Related U.S. Application Data

(60) Provisional application No. 62/211,537, filed on Aug. 28, 2015.

(51) Int. Cl.
| | | |
|---|---|---|
| *B29C 64/386* | (2017.01) | |
| *G06T 17/05* | (2011.01) | |
| *G06F 17/50* | (2006.01) | |
| *G06F 3/12* | (2006.01) | |
| *B29C 64/393* | (2017.01) | |
| *G06T 17/00* | (2006.01) | |
| *B33Y 50/00* | (2015.01) | |
| *B33Y 50/02* | (2015.01) | |

(52) U.S. Cl.
CPC .......... *B29C 64/386* (2017.08); *B29C 64/393* (2017.08); *G06F 3/122* (2013.01); *G06F 17/50* (2013.01); *G06F 17/5004* (2013.01); *G06T 17/00* (2013.01); *G06T 17/05* (2013.01); *B33Y 50/00* (2014.12); *B33Y 50/02* (2014.12); *G06F 2217/04* (2013.01); *G06F 2217/12* (2013.01); *G06T 2207/20108* (2013.01); *Y02P 90/265* (2015.11)

(58) Field of Classification Search
CPC ...... G06F 3/122; G06F 17/50; G06F 17/5004; G06F 2217/04; G06T 17/05; G06T 2207/20108; B29C 64/386; B33Y 50/02
See application file for complete search history.

(56) References Cited

U.S. PATENT DOCUMENTS 9,296,129 B2 * 3/2016 Pallari ................... B29C 33/448
9,928,317 B2 * 3/2018 Bornoff ............... G06F 17/5009
(Continued)

OTHER PUBLICATIONS

Anonymous: "4529191: Mini Upper Part No. '1400' | Brickset: LEGO set guide and database", Nov. 28, 2016, p. 1.
(Continued)

*Primary Examiner* — Crystal J Barnes-Bullock
(74) *Attorney, Agent, or Firm* — Patterson + Sheridan, LLP

(57) ABSTRACT

A system and method for modifying features in designs of objects to make them physically capable of being manufactured using additive manufacturing techniques and machines is provided.

16 Claims, 5 Drawing Sheets

(56) References Cited

U.S. PATENT DOCUMENTS

| | | |
|---|---|---|
| 10,183,329 B2 * | 1/2019 | Gunther ............ G05B 19/41875 |
| 10,204,178 B2 * | 2/2019 | Wegner .................... G06F 17/50 |
| 2015/0024233 A1 | 1/2015 | Gunther |
| 2018/0322694 A1 * | 11/2018 | Byers ....................... G06T 17/05 |

OTHER PUBLICATIONS

Anonymous: "Relief-Wikipedia", Nov. 28, 2016, p. 1, paragraphs 1, 2, 4; p. 2, last paragraph—p. 3, paragraph 1; p. 5, paragraph 2-3.
International Search Report and Written Opinion dated Dec. 9, 2016, issued in corresponding International Patent Application No. PCT/US2016/048901.

* cited by examiner

DEFEATURING TOOL FOR ADDITIVE MANUFACTURING OF OBJECTS

CROSS REFERENCE TO RELATED APPLICATION(S)

This application claims the benefit of and priority to U.S. Provisional Application No. 62/211,537, the entire disclosure of which is hereby incorporated by reference.

BACKGROUND OF THE INVENTION

The present application relates generally to additive manufacturing (e.g., three-dimensional printing) techniques. In particular, this application relates to modifying features in designs of objects to make them physically capable of being manufactured using additive manufacturing techniques and machines. Different additive manufacturing machines may have different capabilities regarding accuracy and resolution of manufacturing and constraints, such as size for example, on building of objects. For these and other reasons, the manufacturing of certain objects or designs may not be feasible using certain additive manufacturing techniques or machines.

Accordingly, there is a need for techniques to modify designs that are not capable of being generated using certain additive manufacturing techniques and/or machines.

SUMMARY

In one embodiment, a system for additive manufacturing is provided. The system comprises a computer control system comprising one or more computers having a memory and a processor. The computer control system is configured to determine if one or more portions of the object of the design file meets a size constraint. If the one or more portions of the object of the design file do not meet the size constraint, the computer control system may calculate a projection of a first portion of the one or more portions of the object of the design file that does not meet the size constraint onto a surface of the object. The computer control system may further be configured to remove the first portion from the design file and add a texture corresponding to the projection to the design file on the surface of the object.

In another embodiment, a method of modifying a design file associated with an object for additive manufacturing is provided. The method may include storing a design file in a memory and selecting a portion of the design file. The method may further include determining if the selected portion of the design file meets a size constraint and calculating a projection of the selected portion when the selected portion does not meet the size constraint. The selected portion may then be removed from the design file and a texture corresponding to the projection to the design file may be added to the design file, wherein the projection is added to a surface of the object.

DETAILED DESCRIPTION OF CERTAIN INVENTIVE EMBODIMENTS

Figure 1:
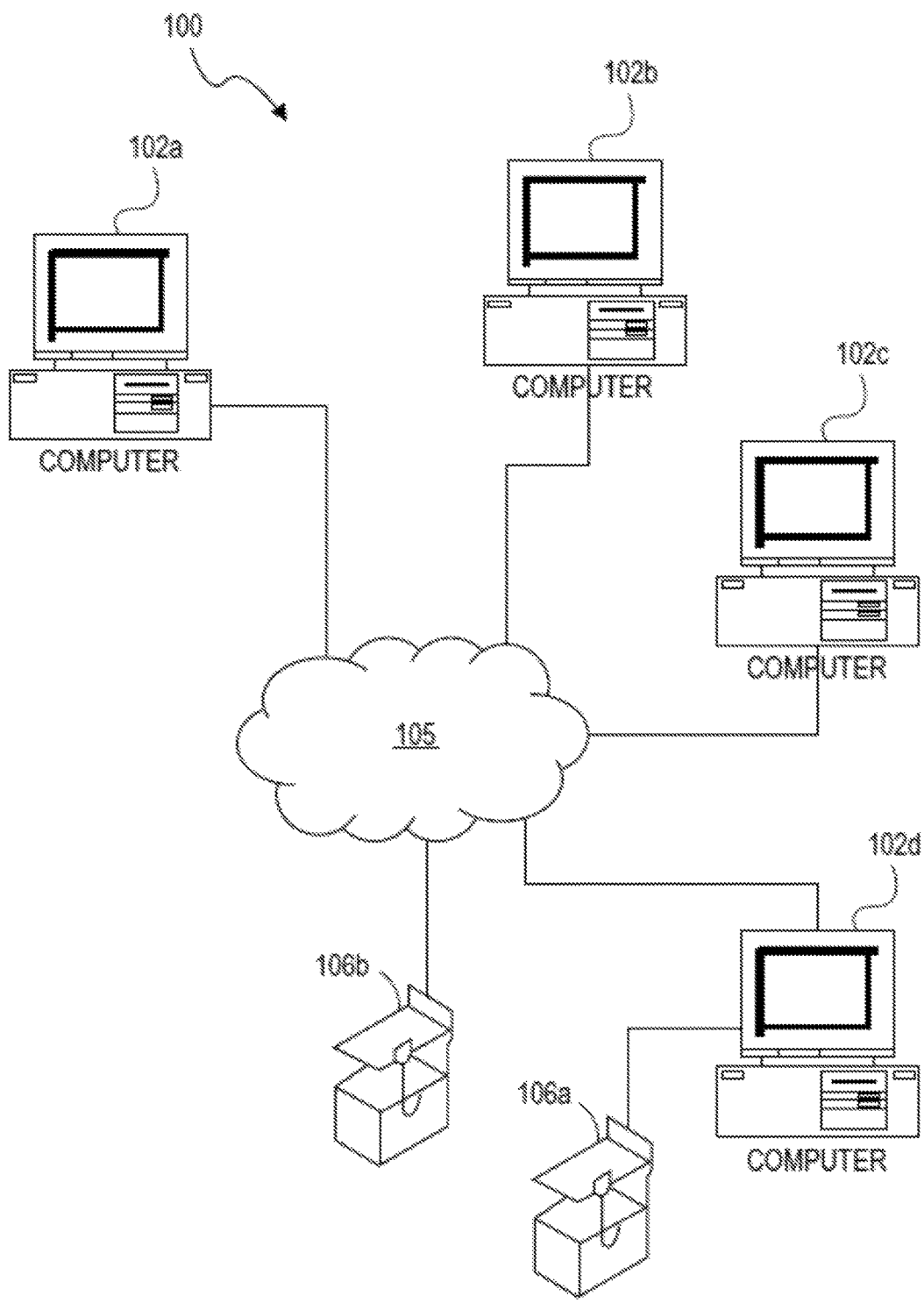
FIG. 1 is an example of a system for designing and manufacturing 3D objects.

Systems and methods disclosed herein include systems and methods for modifying designs of objects to be manufactured using additive manufacturing techniques and machines. Though some embodiments described herein are described with respect to powder-based 3D printing technologies (such as ColorJet printing or binder jetting, for example), the described systems and methods may also be used with certain other additive manufacturing techniques and/or certain other building materials.

The inventors have recognized an existing problem in additive manufacturing relating to object constraints. In particular, in certain situations there are often constraints on the types of objects that can be built. The constraints may be based on the machine used to build the object, the material used to build the object, and/or the technique (e.g., selective laser sintering (LS), stereolithography (SLA), selective laser melting (SLM), fused deposit modeling (FDM), electron beam melting (EBM), etc.) used to build the object. One common type of constraint is a size (e.g., thickness) constraint, which may place limitations on the thickness of objects produced or the types and sizes of details that can be formed by one or more of the previously mentioned additive manufacturing technologies.

Designers of objects are often not well-versed in intricacies of the manufacturing process. As a result, they are often not aware of the types of constraint that can impact how an object is produced. For example, object designs are sometimes made to provide 3D printed replicas of larger objects such as houses or buildings. In these instances, the printed replica is a rescaled version of the original design. As a resulting of the rescaling, certain features of the house or building may become too small to be replicated using 3D printing.

Accordingly, embodiments of systems and methods described herein are configured to modify designs that do not meet certain additive manufacturing constraints so the designs can be properly manufactured. The modification may be performed automatically, or alternatively be defined and/or selected by the user. In particular, for portions or features of designs that are too small (e.g., not thick enough along one or more axes in 3D space), the feature may be converted to a 2D bitmap and projected onto an appropriate surface (e.g., a larger surface the feature is connected to) of the design as a texture. The conversion into a 2D bitmap may take into account the color information of the feature. The feature may then be removed from the object, and instead the texture printed on the appropriate surface of the design so as to make it appear as though the feature is there. The printing may be done in color using appropriate additive manufacturing techniques, such as ColorJet printing, for example. Alternatively or additionally the texturing may be a 3D texture such as a slight height difference. In these embodiments, there is a conversion from a 2D grey value bitmap to a 3D texture. For example, the different grey values can represent slight height differences in the 3D printed object. In this embodiment, the feature meeting the size constraint is replaced by height differences in the printed object. In the final printed object, those height differences are an alternative representation of the feature meeting the size constraint.

In one example, architects may want to design and create small 3D models of the houses they have designed for customers to view before the actual house is built. The architect may want to show all of the features of the house, including door knobs, etc. At such scales, however, the printing of door knobs may not be feasible as they are too small (e.g., too little, too thin, etc.) and do not meet the size constraints based on one or more factors of the additive manufacturing technique and machine used. Embodiments of systems and methods described herein may automatically determine the door knob feature is too small (e.g., based on measure size, thickness, etc.). Further, the systems and methods may convert the feature of the door knob to a 2D bitmap, based on a projection of the door knob onto the door, using standard imaging techniques. The 2D bitmap may include color information regarding the feature of the door knob. In the design of the house, the door knob itself may then be removed from the design, and the 2D bitmap instead added to the design on the door. The design may then be manufactured, so that the image of the door knob is printed on the door, instead of the 3D door knob itself. The door knob still looks like part of the design, but is now actually printable. In some embodiments, the features are not identified and selected automatically. In these embodiments, a user may select manually the features that will be removed from the design and be replaced by a texture.

Embodiments of the invention may be practiced within a system for designing and manufacturing 3D objects. Turning to FIG. 1, an example of a computer environment suitable for the implementation of 3D object design and manufacturing is shown. The environment includes a system 100. The system 100 includes one or more computers 102a-102d, which can be, for example, any workstation, server, or other computing device capable of processing information. In some aspects, each of the computers 102a-102d can be connected, by any suitable communications technology (e.g., an internet protocol), to a network 105 (e.g., the Internet). Accordingly, the computers 102a-102d may transmit and receive information (e.g., software, digital representations of 3-D objects, commands or instructions to operate an additive manufacturing device, etc.) between each other via the network 105.

The system 100 further includes one or more additive manufacturing devices (e.g., 3-D printers) 106a-106b. As shown the additive manufacturing device 106a is directly connected to a computer 102d (and through computer 102d connected to computers 102a-102c via the network 105) and additive manufacturing device 106b is connected to the computers 102a-102d via the network 105. Accordingly, one of skill in the art will understand that an additive manufacturing device 106 may be directly connected to a computer 102, connected to a computer 102 via a network 105, and/or connected to a computer 102 via another computer 102 and the network 105.

It should be noted that though the system 100 is described with respect to a network and one or more computers, the techniques described herein also apply to a single computer 102, which may be directly connected to an additive manufacturing device 106.

Figure 2:
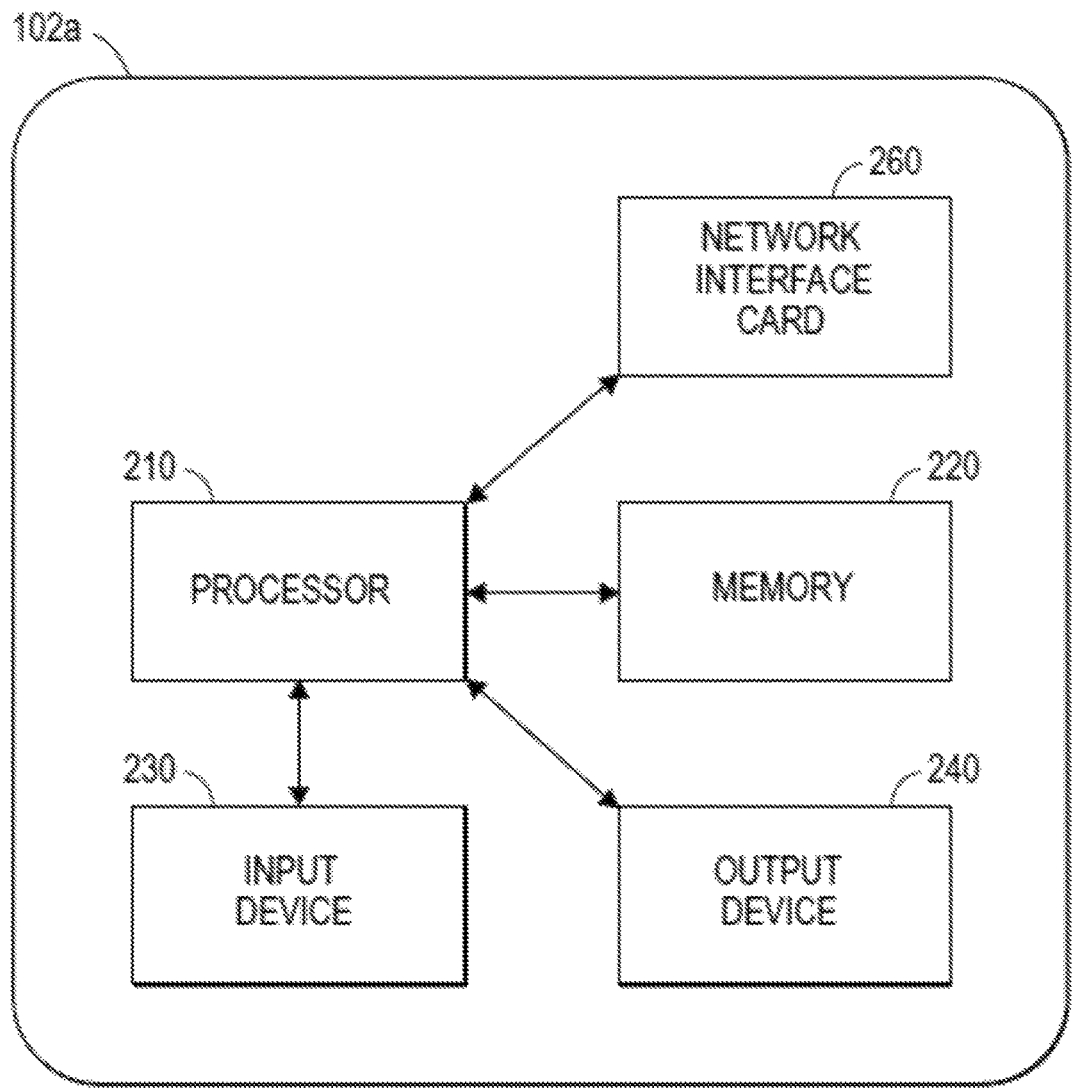
FIG. 2 illustrates a functional block diagram of one example of the computer shown in FIG. 1.

FIG. 2 illustrates a functional block diagram of one example of a computer of FIG. 1. The computer 102a includes a processor 210 in data communication with a memory 220, an input device 230, and an output device 240.

In some embodiments, the processor is further in data communication with an optional network interface card 260. Although described separately, it is to be appreciated that functional blocks described with respect to the computer 102a need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 also may be coupled to an input device 230 and an output device 240 for, respectively, receiving input from and providing output to a user of the computer 102a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
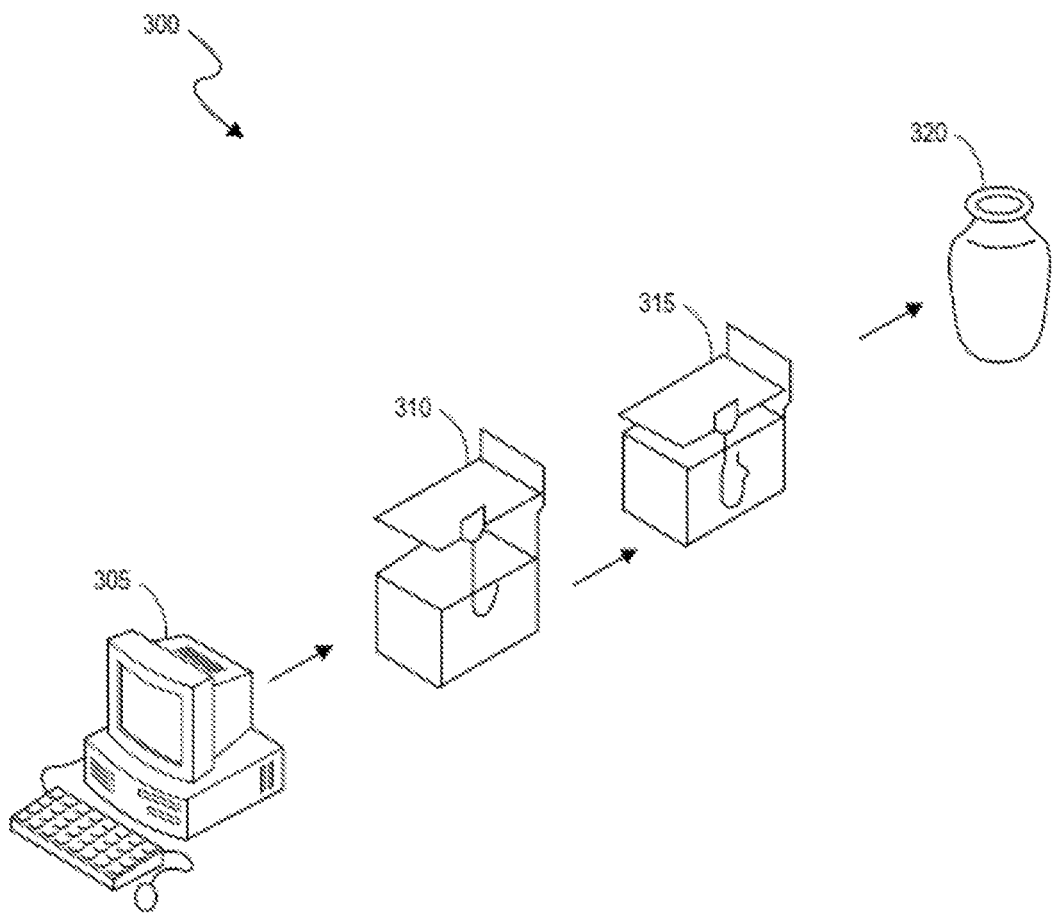
FIG. 3 shows a high level process for manufacturing a 3D object using.

FIG. 3 illustrates a process 300 for manufacturing a 3-D object or device. As shown, at step 305, a digital representation of the object is designed using a computer, such as the computer 102a. For example, 2-D or 3-D data may be input to the computer 102a for aiding in designing the digital representation of the 3-D object. Continuing at step 310, information is sent from the computer 102a to an additive manufacturing device, such as additive manufacturing device 106, and the device 106 commences the manufacturing process in accordance with the received information. At step 315, the additive manufacturing device 106 continues manufacturing the 3-D object using suitable materials, such as a polymer or metal powder. Further, at step 320, the 3-D object is generated.

Figure 4:
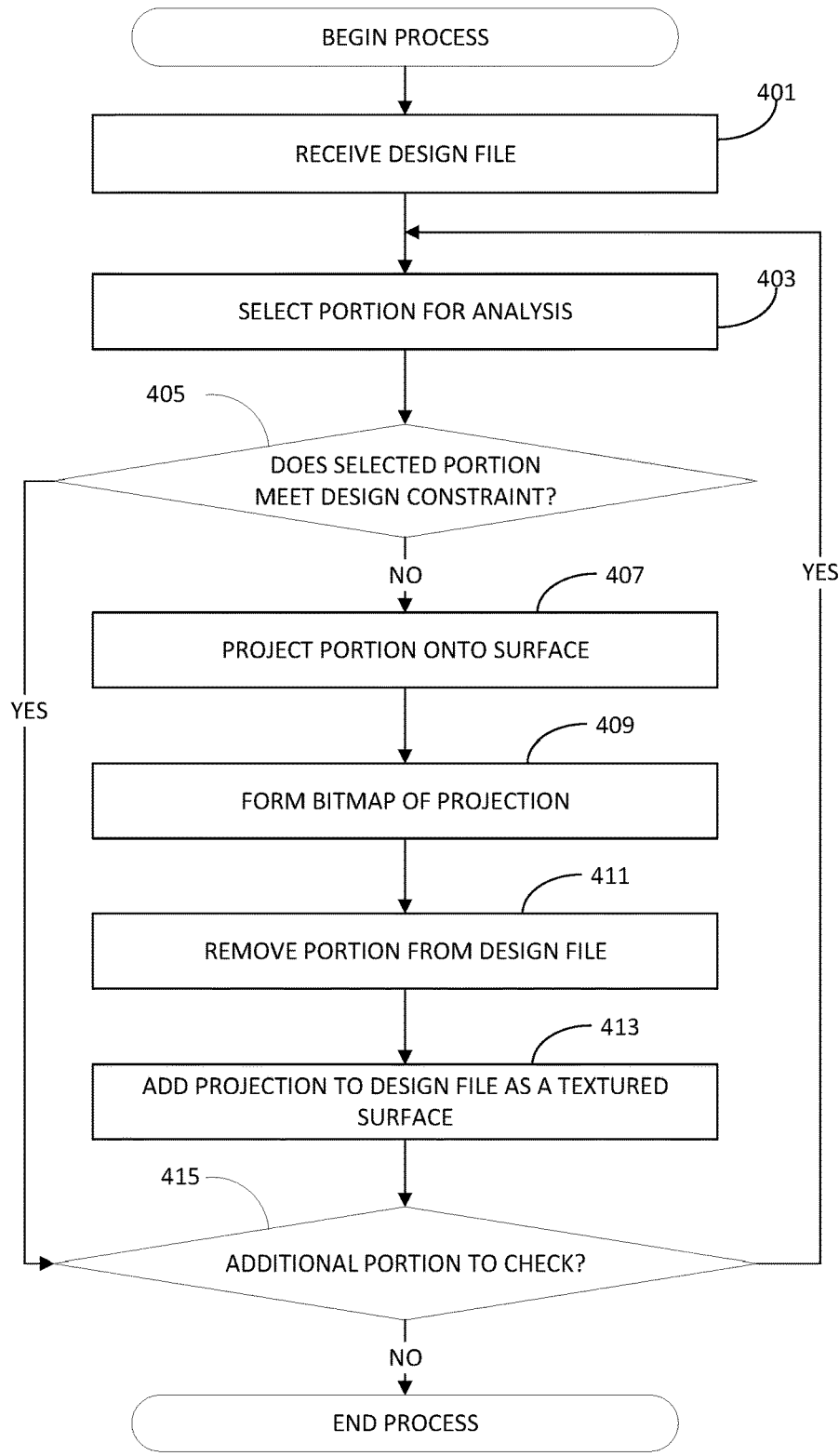
FIG. 4 is a flowchart that illustrates a process by a computer may modify designs of objects to be manufactured using additive manufacturing.

FIG. 4 illustrates a process by which a computer, such as the computer 102 of FIG. 1, may modify designs of objects to be manufactured using additive manufacturing in accordance with various embodiments. The computer 102 may be running software that causes the processor of the computer to perform the steps of the process 400. The process 400 begins at block 401, where the computer 102 receives a design file of an object to be additively manufactured. The design file may be received over a computer network via a network interface such as a network interface card that is associated with the computer 102. In this context, the design file may be transmitted from a first computer to a computer network, transmitted across the network to the computer 102, and then received by the computer 102 via its network interface card, and then stored in memory for processing.

The design file may be in a STL file format (or another appropriate file format) as is used in the additive manufacturing field. The STL file format may permit texturing of surfaces using techniques such as those disclosed in commonly owned U.S. Patent Pub. No. 2015-0045924, the entire contents of which are hereby incorporated by reference. If another file format is used, that file format may also support texturing of surfaces and providing colors to objects.

If the design file is not in an appropriate file format, the computer 102 may convert the design file to a different format using software which is configured to covert, for example, a CAD file to an STL file. Next, the process moves to block 403. There, a portion of the design file may be selected for analysis. The selection of a portion of the design file may include loading the design file into memory and selecting a portion of the file to analyze. The portion may be a layer of the object described of the design file, or it may be a series of layers, or it may be a particular surface described in the design.

Next, the process moves to decision block 405. There, the selected portion of the design file is reviewed to determine whether it meets a design constraint. The design constraint may be defined as portions or features of the object that do not meet a particular size constraint. The review of the design file may be conducted on a layer-by-layer basis or a portion-by-portion basis, for example. In carrying out the review and determination of whether the design file meets a design constraint, the computer 102 may be configured to iteratively determine if the thickness of each given portion of the object is above a pre-defined threshold along each axis of a 3D space. If at block 405, the selected portion of the design file meets the design constraint, the process moves to decision block 415, where a determination is made as to whether there are additional portions of the design file to consider. If so, the process returns to block 403, and another portion of the design file is selected. If there are no further portions to consider, the process ends. Returning to decision block 405, if the selected portion of the design file does not meet the design constraint, the process continues to block 407. There, the computer 102 may calculate a projection of the portion not meeting the design constraint onto a surface of the object. In some embodiments, the computer 102 may take an average of the triangles in the STL file that make up the portion of the object and project that average of the triangles along with the color information of the portion of the object onto a large surface of the object that meets the design constraints. The large surface of the object may be a surface to which the portion of the object is attached or adjacent.

Next, the process moves to block 409. There, the projection may be formed and/or stored as a 2D bitmap in a computer memory such as memory 220, for example. Once the two-dimensional bitmap data has been stored in memory, the process then moves to block 411. At block 411, the portion of the object determined not to meet the size constraint may be removed from the design file (e.g., the STL file). In some embodiments, this portion of the object may be removed by identifying the STL triangles associated with the portion of the object, and then deleting them from the design file. Once the portion of the object has been removed, the process then moves to block 413. There, the projection may be added to the design file as texture and/or color information for the surface onto which the projection was projected. Thus, the portion of the design file not meeting the design constraint is modified to have a similar visual appearance in the object, but without the physical limitation imposed by the design constraint. Once the texturing and/or color information has been added to the design file, the process then moves to decision block 415, where a determination is made as to whether there are additional portions of the file to check. If so, the process returns to block 403. If not, the process ends.

Figure 5A:
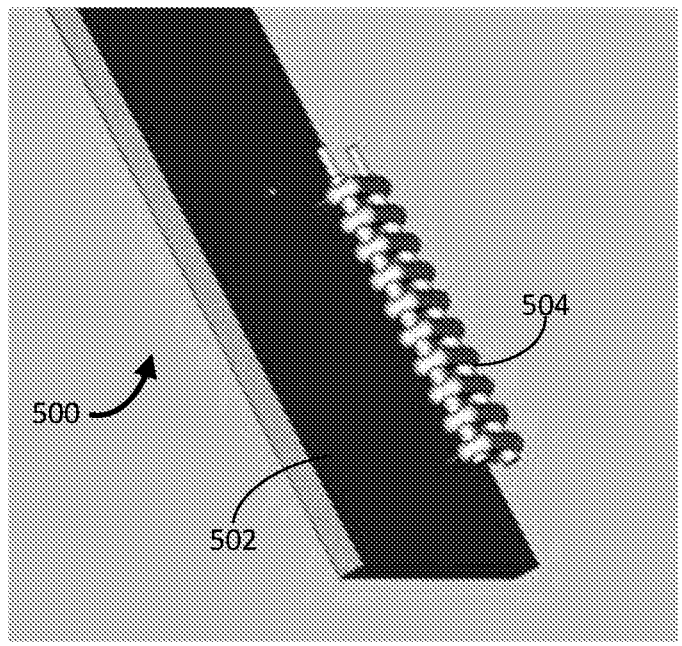
FIG. 5A illustrates an example of an object with a feature to be modified.
Figure 5B:
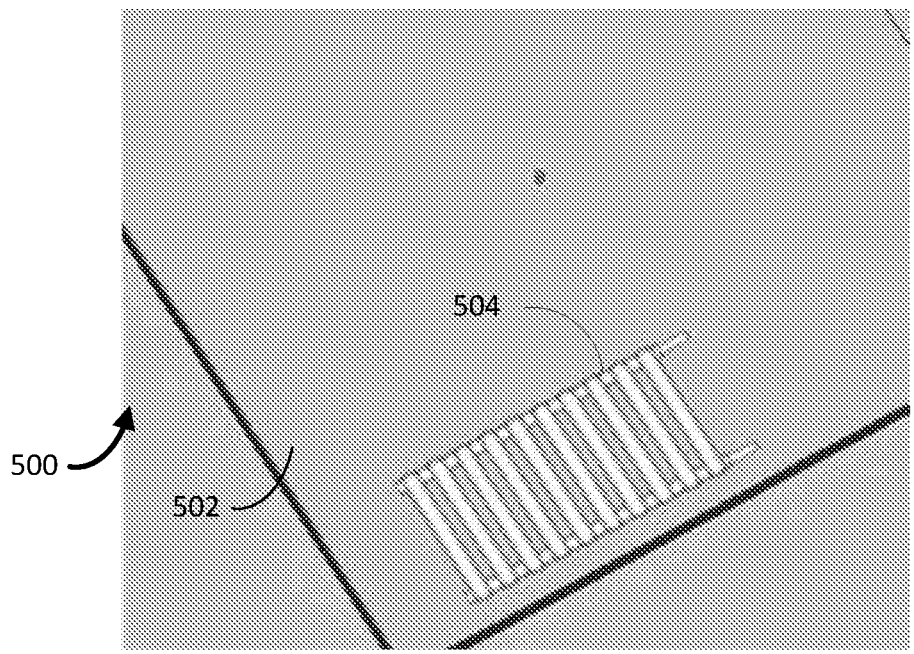
FIG. 5B illustrates an example of the object of FIG. 5A with the feature modified.

Turning now to FIGS. 5A and 5B, a manifestation of the changes to the design file made in FIG. 4 are shown. FIG. 5A shows a miniature object 500 which takes the form of a miniature wall 502. The miniature wall 502 has a miniature radiator 504. The radiator 504 has an intricate design. Due to its small size and intricate design, the additive manufacturing device may not be able to print it. Thus, as described above in connection with FIG. 4, the miniature radiator 504 may be selected as a portion for analysis as described in block 403 of FIG. 4. The miniature radiator 504 may, as described in decision block 405 of FIG. 4, be identified as a portion that does not meet a specified size or design constraint. As a result, the radiator 504 in the design file may be projected onto the surface of the miniature wall 502, and that projection may be converted into bitmap or other two-dimensional image data and stored in memory. The 3D design data making up the miniature radiator 504 may then be removed from the design file (as described in block 411 of FIG. 4). Once the portion of the design file making up the intricate radiator 504 has been removed, the two dimensional projection of the radiator 504 is then added to the surface of the wall 502 to imitate the original design. The modified design is shown in FIG. 5B. There, the radiator 504 is shown as a textured surface (and also may be a different color) on the surface. Thus, the object 500 shown in FIG. 5B may be manufactured using additive manufacturing techniques such as those described herein.

Various embodiments disclosed herein provide for the use of a computer control system. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A system for modifying a design file of an object for additive manufacturing, comprising:
   a computer control system comprising one or more computers having a memory and a processor, the computer control system configured to:
      determine if one or more portions of the object of the design file meets a size constraint;
      calculate a projection of a first portion of the one or more portions of the object of the design file that does not meet the size constraint onto a surface of the object;
      remove the first portion from the design file; and
      add a texture corresponding to the projection to the design file on the surface of the object.

2. The system of claim 1, wherein the computer control system is further configured to calculate the projection by taking an average of triangles that represent the first portion and projecting the average on the surface.

3. The system of claim 1, wherein the texture further includes color information regarding the first portion.

4. The system of claim 1, wherein the texture further includes a three-dimensional texture comprising height differences with respect to the surface of the object.

5. The system of claim 1, wherein the size constraint comprises a thickness threshold in any direction in three dimensions.

6. The system of claim 1, wherein the computer control system is further configured to control manufacture of the object based on the design file.

7. The system of claim 1, wherein the determining comprises selecting a portion of the design file for analysis, wherein the portion is a layer or a series of layers of the object described by the design file.

8. The system of claim 1, wherein the additive manufacturing is one of the following: a powder-based 3D printing technology, ColoJet printing, binder jetting, selective laser sintering (LS), stereolithography (SLA), selective laser melting (SLM), fused deposit modeling (FDM), electron beam melting (EBM).

9. A method of modifying a design file associated with an object for additive manufacturing, the method comprising:
   storing a design file in a memory;
   selecting a portion of the design file;
   determining if the selected portion of the design file meets a size constraint;
   calculating a projection of the selected portion when the selected portion does not meet the size constraint;
   removing the selected portion from the design file; and
   adding a texture corresponding to the projection to the design file, wherein the projection is added to a surface of the object.

10. The method of claim 9, wherein calculating the projection comprises taking an average of triangles that represent the selected portion and projecting the calculated average onto the surface of the object.

11. The method of claim 9, wherein the texture further includes color information relating to the selected portion.

12. The method of claim 9, wherein the texture further includes a three-dimensional texture comprising height differences with respect to the surface of the object.

13. The method of claim 9, wherein the size constraint comprises a thickness threshold in any direction in three dimensions.

14. The method of claim 9, further comprising manufacturing the object based on the modified design file.

15. The method of claim 9, wherein the determining comprises selecting a portion of the design file for analysis, wherein the portion is a layer or a series of layers of the object described by the design file.

16. The method of claim 9, wherein the additive manufacturing is one of the following: a powder-based 3D printing technology, ColorJet printing, binder jetting, selective laser sintering (LS), stereolithography (SLA), selective laser melting (SLM), fused deposit modeling (FDM), electron beam melting (EBM).

* * * * *